United States Patent [19]

Schoenherr et al.

[11] Patent Number: 5,456,571
[45] Date of Patent: Oct. 10, 1995

[54] APPARATUS AND METHOD FOR HANDLING BUSINESS FORMS

[75] Inventors: William R. Schoenherr, Hinsdale; Donald J. Nauheimer, LaGrange Park; Jerome F. Andersen, Chicago, all of Ill.

[73] Assignee: Wallace Computer Services, Inc., Hillside, Ill.

[21] Appl. No.: 270,033

[22] Filed: Jul. 1, 1994

Related U.S. Application Data

[63] Continuation-in-part of Ser. No. 174,306, Dec. 29, 1993, which is a continuation-in-part of Ser. No. 60,795, May 12, 1993, Pat. No. 5,322,496.

[51] Int. Cl.⁶ ................................................. B65G 67/00
[52] U.S. Cl. ....................................... 414/786; 414/343
[58] Field of Search ............................... 414/343, 350, 414/345–347, 396, 401, 584, 786, 798.2, 798.8; 493/410, 416

[56] References Cited

U.S. PATENT DOCUMENTS

| | | | |
|---|---|---|---|
| 2,335,692 | 11/1943 | Murray | 414/346 |
| 3,489,300 | 1/1970 | McCartney et al. | 414/343 X |
| 3,851,773 | 12/1974 | Kluge et al. | 414/788.3 |
| 3,883,131 | 5/1975 | Anderson, Jr. et al. | 493/433 |
| 3,887,088 | 6/1975 | Fernandez-Rana et al. | 414/798.2 |
| 3,974,921 | 8/1976 | Tokuno | 414/789.2 |
| 4,103,786 | 8/1978 | Tokuno | 414/789.2 |
| 4,197,045 | 4/1980 | Stauber | 414/788.2 |
| 4,429,889 | 2/1984 | Westra | 280/79.11 |
| 4,669,943 | 6/1987 | Zamotion | 414/343 |
| 4,808,058 | 2/1989 | Carney et al. | 414/343 |
| 4,865,339 | 9/1989 | Rundborg et al. | 414/346 X |
| 4,913,614 | 4/1990 | O'Rarden | 414/343 |
| 5,061,233 | 10/1991 | Schultz et al. | 414/798.2 X |
| 5,174,454 | 12/1992 | Parkander | 209/3.3 |
| 5,257,892 | 11/1993 | Branch | 414/346 X |
| 5,273,516 | 12/1993 | Crowley | 493/416 |
| 5,320,475 | 6/1994 | Pinder | 414/343 |
| 5,322,496 | 6/1994 | Ernst et al. | 493/410 |

FOREIGN PATENT DOCUMENTS

| | | | |
|---|---|---|---|
| 2110171 | 6/1983 | United Kingdom | 414/347 |

OTHER PUBLICATIONS

Wallace Brochure LASERMAX Feb. 11, 1992.
Roll Forms Transfer System.
Stralfors brochure Guide for Optimal Use of Maxlaser 180.

*Primary Examiner*—David A. Bucci

[57] ABSTRACT

Apparatus and method for handling business forms that are zig-zag folded including a printed forms transport and a printed stack transport, the printed forms transport including a caster-equipped undercarriage and a generally elongated forms-receiving box pivotally mounted on the undercarriage, the box having a pair of sides, an open end for receiving the forms and a closed end, an open top and a planar bottom, a tine member removably mounted on the box at the open end, a printed stack transport releasably engaged with the printed forms transport, and cylinders connecting the undercarriage with the box for pivoting the box through a vertical arc to convert the string of forms to a stack of business forms and to deposit the stack on the printed stack transport, the printed stack transport having a platform equipped with elongated slots aligned with the tine member when the printed forms transport and the printed stack transport are engaged.

4 Claims, 10 Drawing Sheets

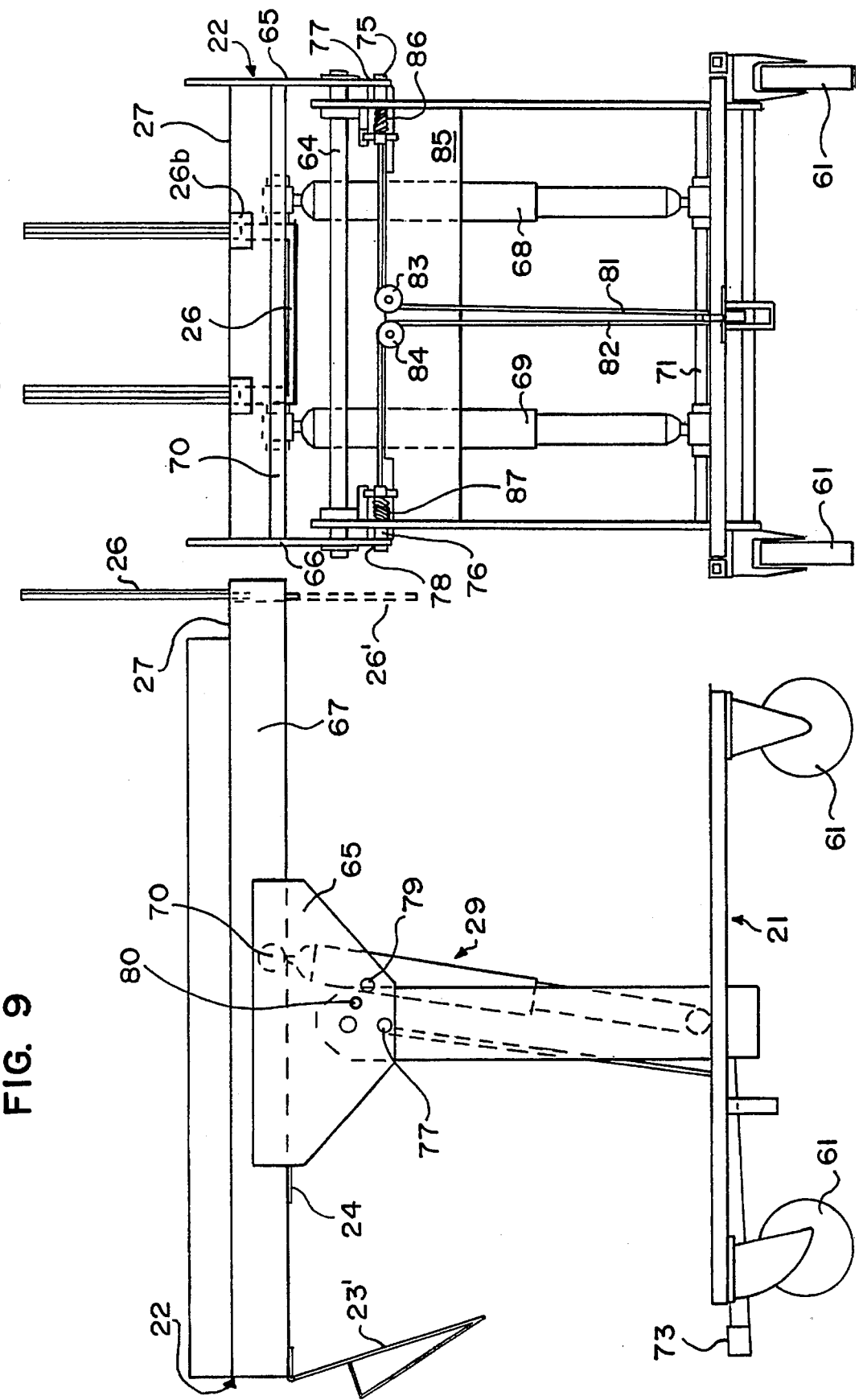

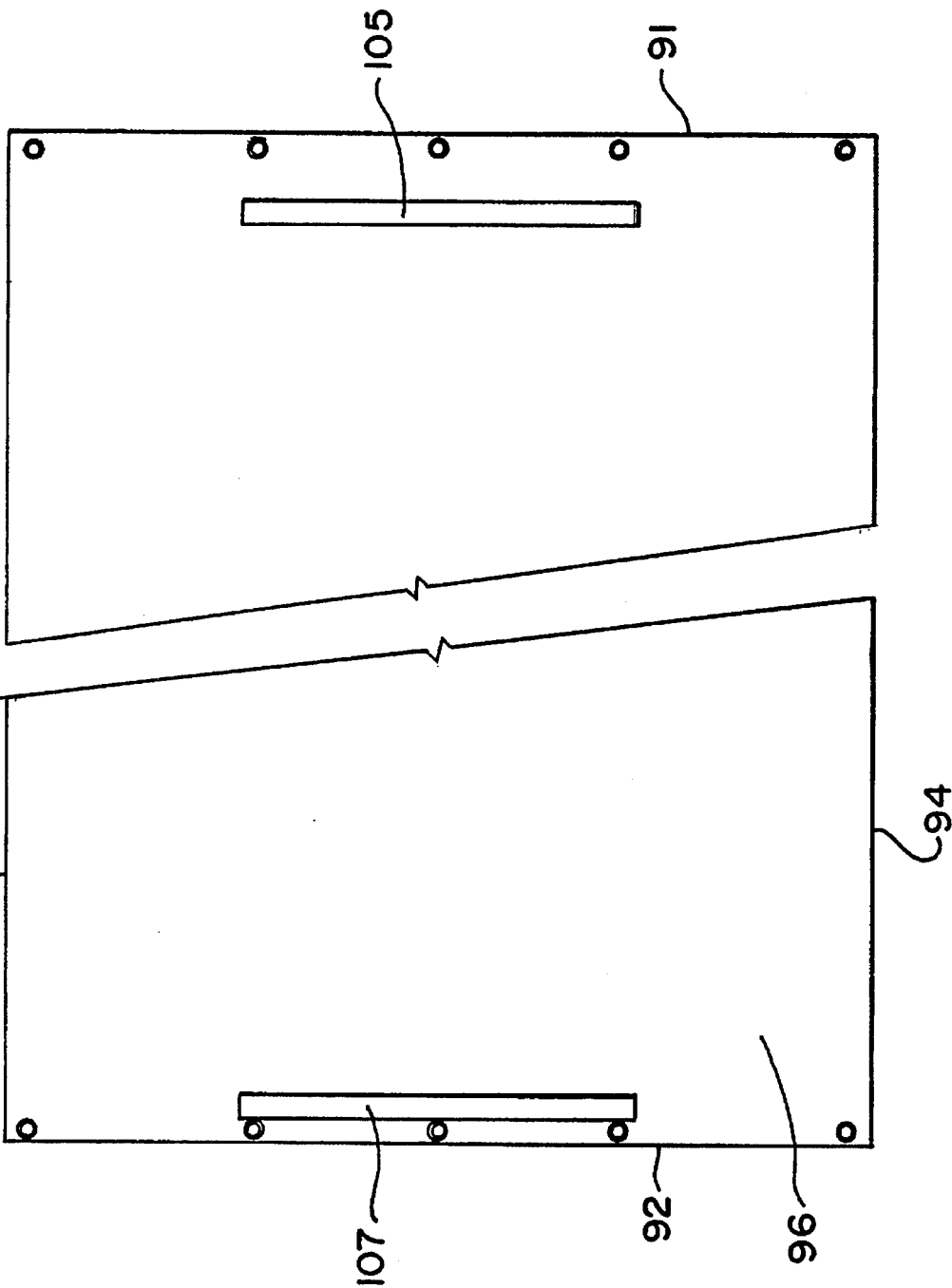

APPARATUS AND METHOD FOR HANDLING BUSINESS FORMS

This application is a continuation-in-part of application Ser. No. 08/174,306, filed Dec. 29, 1993, which was a continuation-in-part of Ser. No. 08/060,795, filed May 12, 1993, now U.S. Pat. No. 5,322,496.

BACKGROUND AND SUMMARY OF INVENTION

This invention relates to an apparatus and method for handling business forms and, more particularly for delivering compacted forms to a transport for relocation.

This invention is an improvement on the printed forms transport (hereafter "PFT") of Wallace Computer Services, Inc., of Hillside, Ill. and also the competitive prior art transport seen in U.S. Pat. No. 5,061,233.

The PFT is a receiver for zig-zag folded forms which normally have been generated by a computer printer and folder/compactor. These machines operate at high speed and it is difficult to coordinate them with other machines employed by companies who process large volumes of business forms.

Usually, the output of the computer printer and folder/compactor goes to a machine called an inserter— sometimes referred to as a forms utilization unit. In many instances, the machinery creating the final forms is located in one section of a forms processing plant while the inserter(s) are located in another area. This has necessitated the need for transport from the first to the second area. It was for this purpose that the PFT and '233 constructions were developed. These constructions were expensive and users sought cheaper and more easily handled ways of relocating stacks of zig-zag folded forms.

One proposal was to use the stacking cart of U.S. Pat. No. 4,429,889. Although this proved less expensive, the cart lacked the flexibility and utility of a transport developed specifically for zig-zag folded stacks of business forms. These drawbacks have been overcome by the instant invention.

First, the PFT has been modified and a novel printed stack transport (hereafter "PST") provided. The PFT is equipped with removable tine assemblies for stack support and the PST equipped with a slotted platform for receipt of the tines incident to transfer of a stack. It will be appreciated that stack transfer is a crucial step in the relocation of the printed forms and absolute reliability is necessary. The destruction or disablement of even one printed form can upset the carefully controlled program of handling of forms—such as numbered bills, personalized letters, etc. Through the cooperation of the novel PFT and PST, this problem is solved and a high degree of reliability achieved.

The PFT includes a box means which is pivotably mounted on an undercarriage so that the box means and the business forms thereon can be pivoted to a vertical position. The box means is provided with a slot adjacent each end thereof, and a generally U-shaped tine assembly is slidably insertable into each slot. Business forms can be introduced into either end of the box means by inserting a tine assembly into the slot at one end and introducing the forms at the other end.

Each tine assembly includes a pair of tines and a generally triangular brace attached to each tine. The tine assembly at the end of the box means which supports the stack of forms is positioned so that the braces are on the sides of the tines opposite the forms. The tine assembly at the other end of the box means can be positioned so that the braces are engageable with the forms to facilitate compacting the forms on the box means.

The reliability of the PST is also promoted through a novel superstructure arrangement. Above the platform, the PST is equipped with upstanding walls which define a plurality of recesses. Each recess is itself defined by one wall that is vertical and a second wall that is inclined to the vertical. The platform is perpendicular to this second wall. The wall/platform arrangement promotes stack transfer while at the same time promotes stack integrity, i.e., avoids undesirable "lean".

Other features and advantages of the invention may be seen in the details set down in the ensuing specification.

BRIEF DESCRIPTION OF DRAWINGS

The invention will be explained in conjunction with the accompanying drawings, in which

FIG. 9 is a side elevational view of the PFT;

FIG. 10 is an end elevational view of the PFT of FIG. 9;

FIG. 15 is a top view, partially broken away, of the PFT of FIG. 13;

DETAILED DESCRIPTION

Prior Art

Figure 1:
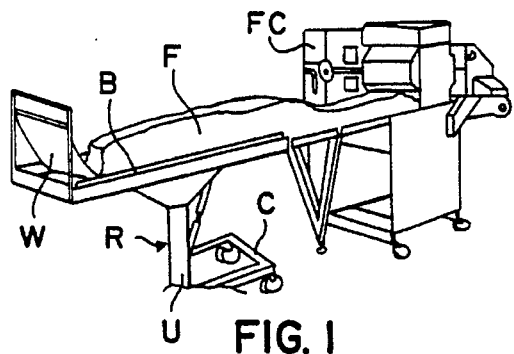
FIG. 1 is a perspective view of the prior art PFT shown during the loading operation.

Referring to FIG. 1, the symbol FC designates generally a folder-compactor which develops a stream of zig-zag folded forms in a partially compacted condition—the forms being designated F. The forms are seen to be supported on a box means B which is the upper portion of the PFT or receiver generally designated R. The box means portion is supported on the undercarriage U portion of the PFT receiver R. The undercarriage U includes a generally rectangular wheel-equipped chassis C.

Figure 2:
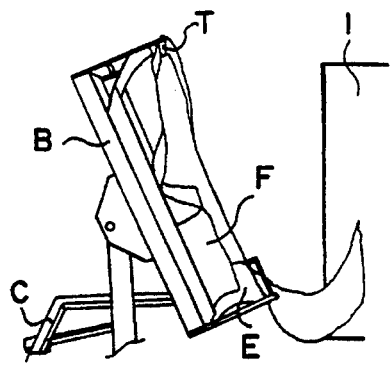
FIG. 2 is a perspective view of the prior art PFT in the process of transferring the forms to the inserter.

After a predetermined number of forms have been introduced into the box means B, an end plate E is inserted to delimit the end or size of the stack—the end plate E being seen at the center bottom of FIG. 2. Thereafter, the receiver is moved from the folder/compactor FC to the inserter I. In FIG. 2, the forms F are seen in the process of being introduced into the inserter I—being threaded over turning bar means T at both the top and bottom of the box means B.

Figure 3:
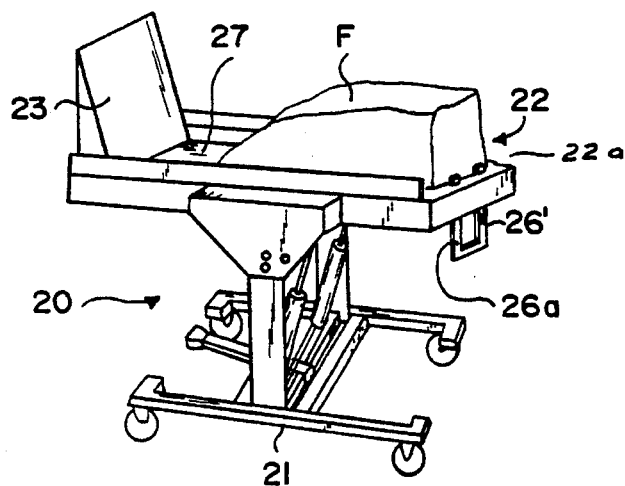
FIG. 3 is a fragmentary perspective view of an improved PFT.
Figure 4:
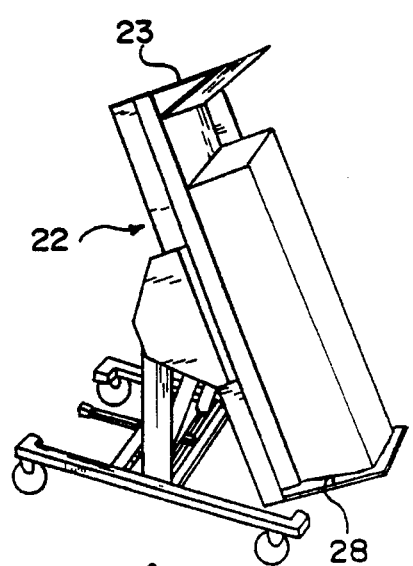
FIG. 4 is another perspective view of the improved PFT shown in loaded condition and partially pivoted as part of the process for discharge to the PST.

The Invention-Embodiment of FIGS. 3–4

Reference is now made to FIG. 3 wherein the numeral 20 designates generally the inventive PFT receiver which includes an undercarriage 21 which is generally the same as the undercarriage of the prior art—but with changes in construction to permit the novel operation of the instant invention.

The numeral 22 designates a box means mounted on the undercarriage 21 which is generally analogous in function to that of the prior art box means B. Here the end wall 23 at the closed end of the box means 22 is planar—not having the curved end wall configuration W of the prior art PFT of FIG. 1. It is also pivotally mounted—see FIG. 9 at 23' where the end wall is in partial pivoted position. When pivoted completely to the 23' position of FIG. 9, it is releasably retained in place by magnet means 24. This is possible because the box means 22 and particularly the end wall 23, are made of stainless steel. The pivot operation is performed only when the loading sequence is reversed—the stack being Z to A rather than the usual A to Z. When the string is introduced through the normally closed end, A will still be at the top of the stack.

A significant change from the prior art is found in the construction of the open end 22a of the box means 22. The change is embodied in the tine means generally designated 25. In the illustration given, the tine means 25 are provided as a U-shaped member 26—see FIG. 3 and the upper central portion of FIG. 10. During loading of the box means 22 with a string of zig-zag folded forms (as in FIG. 1), the U-shaped tine-providing member is retracted to be positioned below the support surface 27 of the box means 22—as in FIG. 3 and at 26' in FIG. 9.

It is believed that the invention can be best and most quickly understood from a consideration of the various steps performed in the use and operation of the PFT and PST.

Operation of PFT

The operation of the PFT 20 initially follows the same steps as the prior art of FIG. 1. There, a string of forms arranged in zig-zag folded condition are introduced into the box means 22 of FIG. 3 and onto the support surface 27. At this time, the U-shaped tine member 26 is retracted to the position designated 26' in FIGS. 3 and 9. In FIG. 3, the folder/compactor FC has been omitted and the showing in FIG. 3 is of the forms F in the process of being developed into a stack.

Thereafter, the tine member 26 (see FIGS. 9 and 10) is elevated to the solid line in FIG. 9 (and also in FIG. 10) which serves to delimit and confine a predetermined number of forms which ultimately become a stack. At the same time, it is possible to insert a barrier means such as a chip board between the last form of the incipient stack and the tine member 26 as is shown at 28 in FIG. 4. Thereafter the box means 22 is pivoted through a vertical arc to the position shown in FIG. 5. At this time, the box means 22 is disposed at an angle of about 77° to the horizontal, i.e., has moved through an arc of 77° from the showing in FIG. 3. The pivoting is provided by means of cylinder means 29 (see for example FIG. 9) and which are interposed between the undercarriage 21 and the box means 22. As the box means 22 reaches the configuration or position of FIG. 5, the stack S is firmly and reliably supported on the barrier 28 which is interposed between the last form of the stack and the tine means 25.

Operation of PFT/PST

Figure 5:
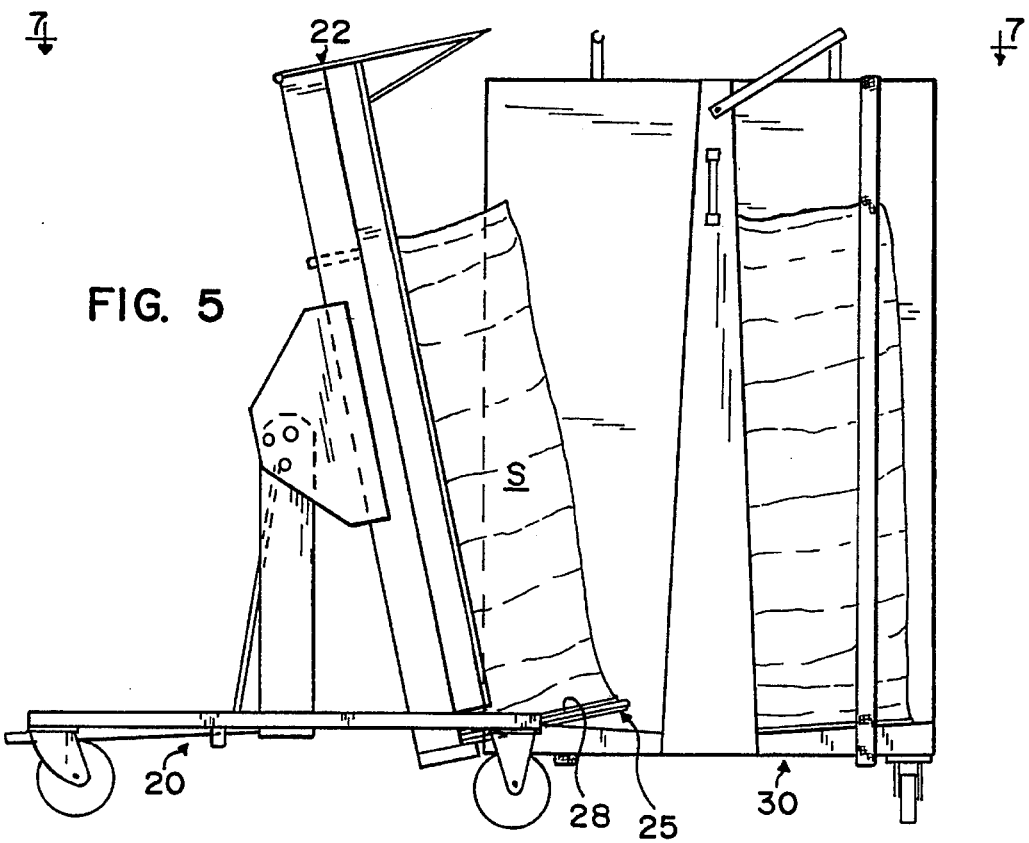
FIG. 5 is a side elevational view of the inventive PFT and PST in the process of transfer.
Figure 6:
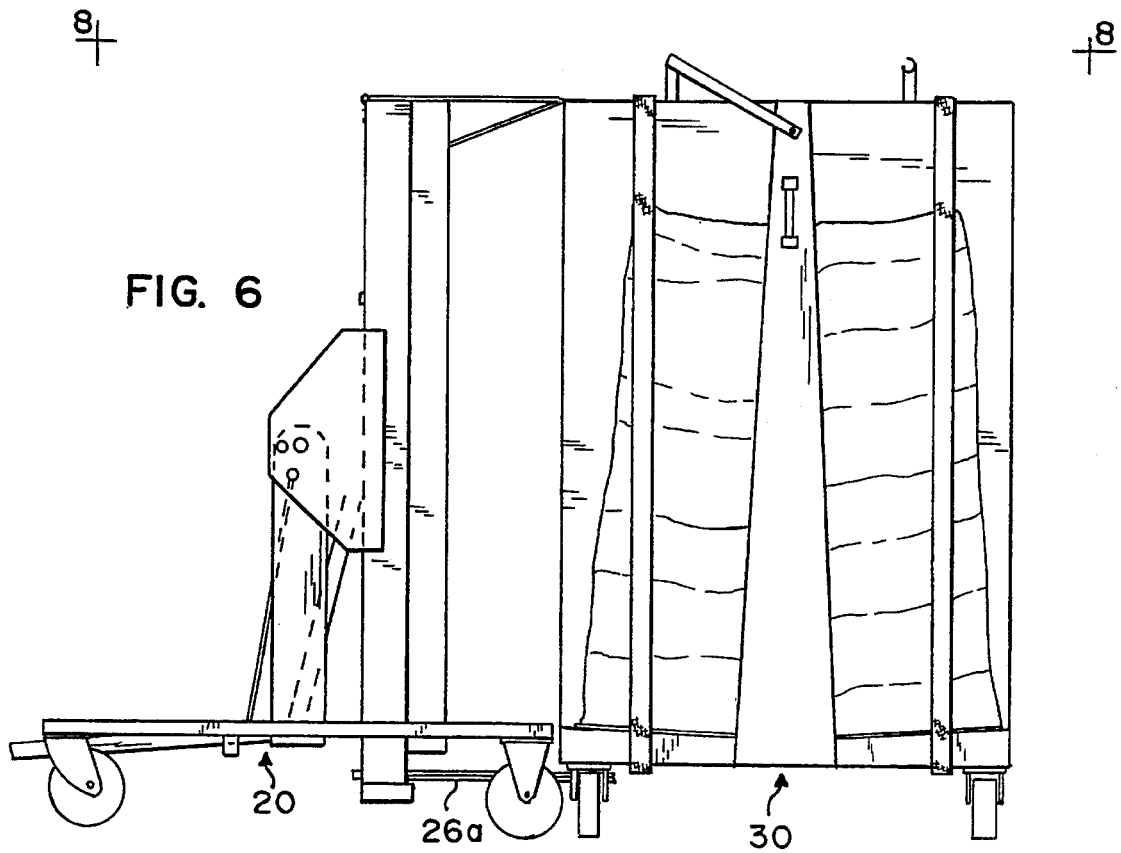
FIG. 6 is a view similar to FIG. 5 but after transfer has occurred.

With the PFT in the orientation depicted in FIG. 5, it is moved into engagement with the PST generally designated 30 (see the right hand portions of both FIGS. 5 and 6).

The PST 30, in the illustration given, includes a platform generally designated 31 (see FIG. 12) which is equipped on its underside with four casters as at 32. Upstanding from the platform 31 is a superstructure generally designated 33 and which includes walls defining four stack-receiving recesses 35, 36, 37 and 38. Except for their location relative to one another, the recesses 35–38 are essentially the same. For this purpose, the superstructure 33 includes a first divider 39 which is disposed generally vertically, i.e., perpendicular to the floor on which the casters roll. Each recess is further defined by a second divider 40 (still referring to FIG. 12) which has angled opposite sides and in side elevation appears somewhat trapezoidal. Thus, the wall-providing dividers 39 and 40, as they define each recess, intersect along a line which is inclined to the vertical as at 41 (see FIG. 12).

The platform 31 has a portion at the bottom of each recess and, for example, relative to the recess 38, the platform portion 42 is arranged perpendicularly to the inclined wall 43 of the wall-providing divider 40. Thus, the platform 42 intersects the wall 44 provided by divider 39 along a line 44a which is inclined differently relative to the horizontal. In the prior art, the platform at the bottom of each recess or trough was inclined so that any stack would slide downwardly toward the intersection of the two recess-forming walls. We have found that it is advantageous to slope only one wall and the platform accordingly whereby the other wall serves as a stabilizing means for a stack being introduced into the recess and which might have a tendency to lean or shingle.

The "straight" wall 44 is also parallel to the relatively elongated slots 45 provided in the platform 31 and which are vertically aligned with the tine member 26. This can be appreciated from a consideration of FIG. 7 where the slots are designated 45 and each of the projecting portions of the tine member are designated 26a. As indicated, this is the condition of the PFT and PST also illustrated in FIG. 5. Then, as the box means 22 is pivoted further clockwise to a vertical orientation, the tines 26a pass through the platform and below it so that when the PFT is retracted, the tines 26a are in the position illustrated in FIGS. 6 and 8.

Figure 12:
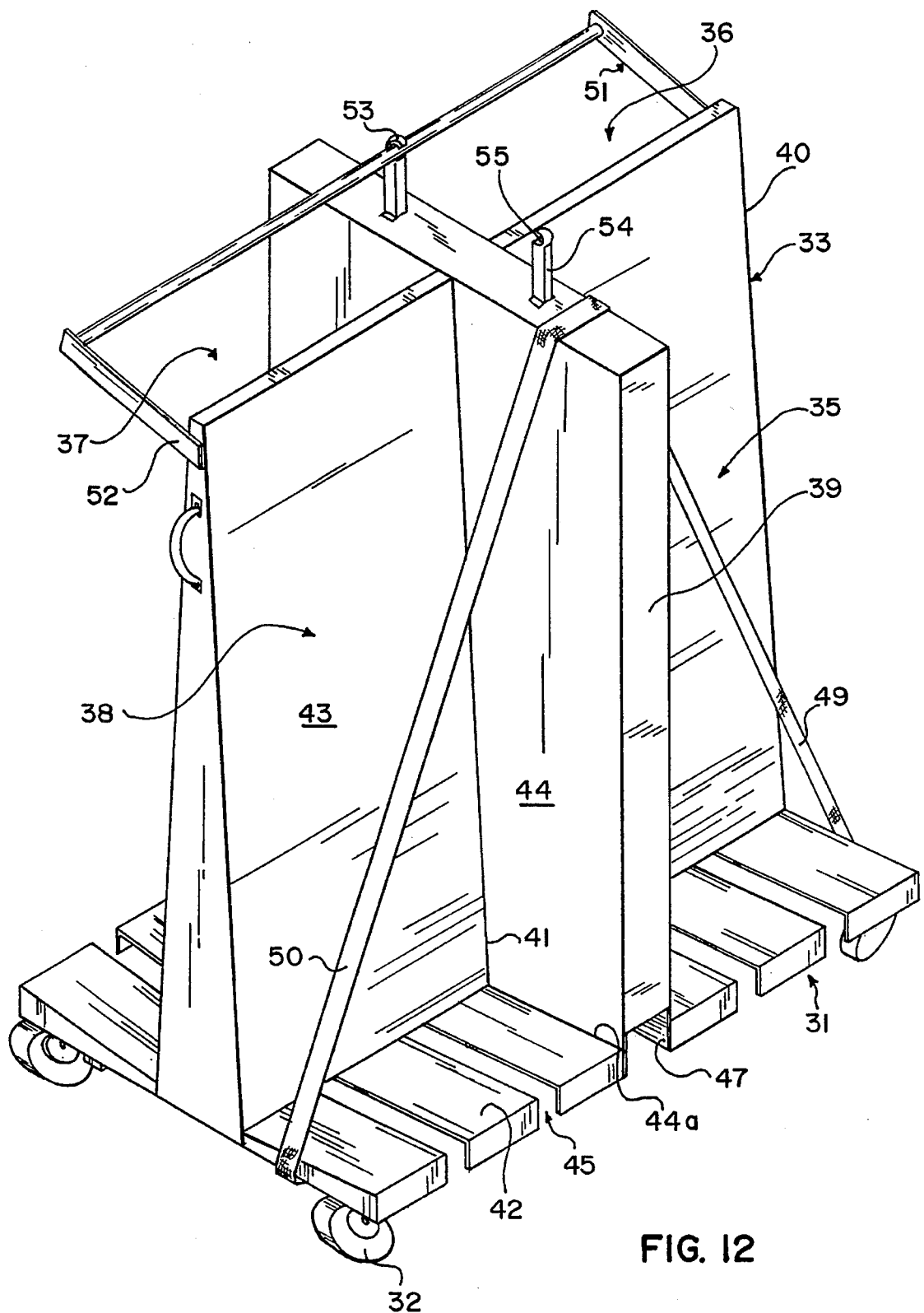
FIG. 12 is a perspective view of the PST.

The engagement of the PFT 20 with the PST 30 is controlled, in effect, by virtue of the rail 46 (see FIG. 7) entering an opening 47 in the platform 31 (see also FIG. 12). It will be appreciated that each opening 47 does double duty because it receives one rail 46 when a stack is introduced into the recess 35 (see FIG. 7) and receives the other caster-equipped rail 48 when a stack is introduced into the recess 38.

The procedure relative to the engagement of a PFT with the PST include usually the introducing of four stacks of zig-zag folded forms into the recesses 35–38. This can be done expeditiously so that only one PFT is needed for each printer line. On the other hand, a number of PSTs can be employed for each printer line.

Operation of PST

After stacks have been introduced into the various recesses 35–38, the stacks may be confined and stabilized by means of strapping as at 49 and 50 (see FIG. 12). The strapping 49, 50 is advantageously constructed of self-engaging material such as Velcro and may span just a single recess or both recesses depending on where the straps meet, the length thereof, the type of reel employed, etc. Advantageously, seatbelt-type reels are employed and mounted conveniently on the underside of the platform 31 with mating Velcro patches provided either on the opposite belt or on the top of the wall 39. It will be seen that each belting arrangement 49, 50 services adjacent recesses 38, 35 on opposite sides of the straight wall 39.

After the PST has been relocated to a position adjacent an inserter, a turning bar arrangement generally designated 51 is positioned for threading of the web from the stack thereover—generally in the fashion illustrated in FIG. 2.

In the illustration given, the turning bar arrangement 51 is pivotally mounted as at 52 on the second wall 40 and is movable through a vertical arc from that shown where it is received within a clamp 53 between recesses 36 and 37 to a second clamp 54 also mounted on the wall 39 and between the recesses 35 and 38. Each of the clamps 53, 54 is provided with clamping jaws 55 (see the upper central portion of FIG. 12). Thus, a single turning bar by virtue of being pivoted, serves adjacent recesses as at 37/38 or 35/36.

Undercarriage of PFT

Figure 11:
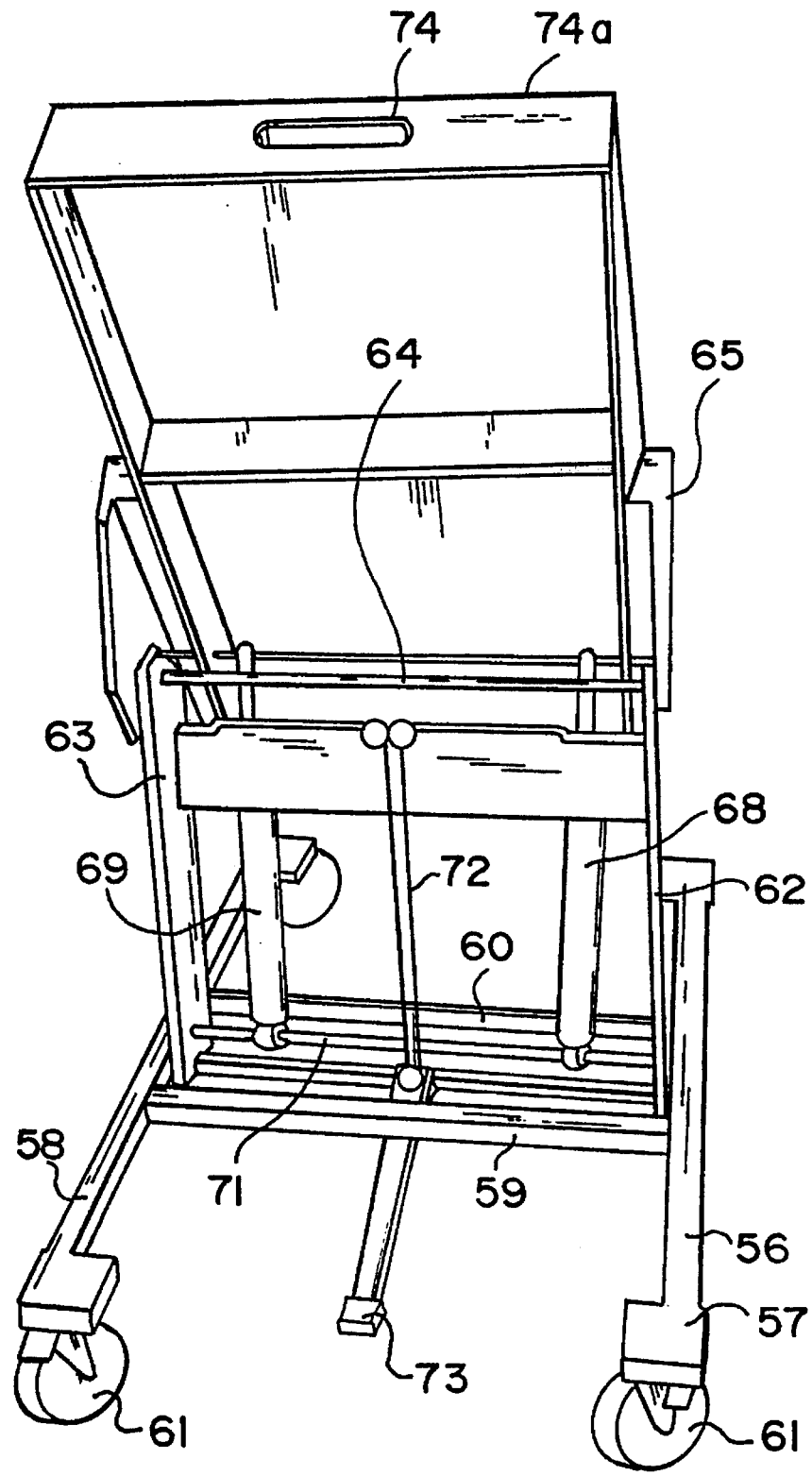
FIG. 11 is a perspective view of the PFT.

The undercarriage 21 is seen in greater detail in FIGS. 9–11. Turning first to FIG. 11, the undercarriage is seen to include a generally H-shaped chassis 56 which is made up of longitudinal members 57, 58 integrated with transverse members 59 and 60 near the mid points of the longitudinal members, i.e., spaced from the ends. Mounted at the ends of the longitudinal members 57, 58 are four wheels or casters 61.

A pair of uprights 62, 63 extend upwardly from the longitudinal members 57, 58 respectively and are positioned between the transverse members 59, 60. At their upper ends, the uprights 62, 63 are connected by a cross shaft 64.

Journaled on the cross shaft 64 are trapezoidally shaped plates 65 and 66 (compare the upper portions of FIGS. 9 and 10). Fixed to the trapezoidally shaped plates 65, 66 is a subframe 67 which is generally rectangular in outline—and which carries the box means 22 (see FIG. 9). The subframe 67 and therefore the box means 22 are pivotable between a loading position (horizontal) as seen in FIG. 9 and a discharge position (77° to horizontal).

Interconnected between the trapezoidally shaped plates 65, 66 and the frame 56 are a pair of shock absorbers 68, 69— best seen in FIG. 10 and which constitute the cylinder means 29 (see FIG. 9). More particularly, the upper ends of the shock absorbers 68, 69 are pivotally connected to a cross shaft 70 which extends between the trapezoidally shaped plates 65, 66. At their bottom ends, the shock absorbers 68, 69 are pivotally connected to a lower cross shaft 71 (still referring to FIG. 10). It will be noted particularly from FIG. 9 that the upper connection of the shock absorbers to the cross shaft 70 is eccentric to the cross shaft 64. The cross shaft 71 to which the bottom ends of the shock absorbers 58, 59 are connected is itself interconnected between the lower extremities of the uprights 62, 63.

A latching means generally designated 72 (see FIG. 11) and which includes a foot pedal 73 (see the lower left hand portion of FIG. 11) is provided to maintain the box means 22 in three different orientations. The details of the latching means 63 will be described hereinafter but first we describe the operation of the parts of the undercarriage 21 described thus far.

Undercarriage Operation

The beginning of the operation of the undercarriage starts with the box means 22 oriented horizontally as seen in FIG. 9. Depressing the foot pedal 73 unlatches the upper portion of the undercarriage so as to permit pivoting movement of the box means 22. This is conveniently started by grasping the handle means 74 on the closed end wall 74a of the box means 22 (see the upper portion of FIG. 11). The box means 22 and the subframe 67 can then be pivoted away from their horizontal orientation. As the box means 22 pivots, one end thereof is lowered, and the other end is raised (see FIG. 4). The shock absorbers 68, 69 are connected to the box means between the pivot shaft 64 and the end 91 which lowers. It will be appreciated that at this stage, the tines 26a are already extending upwardly from the box means 22. As lifting pressure is exerted on the box means 22 through the handle means 74, the shock absorbers 68, 69 contract from the showing in FIG. 9 to that illustrated in FIG. 6.

Latching Means

The latching means 72 can be best appreciated form FIG. 10 and include spring-loaded dowels 75, 76 which engage holes in the trapezoidally shaped plates 65, 66 in different portions thereof. For example, in FIG. 9 where the box means 22 is disposed horizontally, the dowels 75, 76 engage aligned openings 77, 78 (see also FIG. 22) in the plates 65, 66 respectively.

We also provide a second pair of openings as at 79 (see the upper central portion of FIG. 9) for maintaining the box means 32 in an orientation of about 77° away from the horizontal. This permits an advantageous further compaction of the now-developed stack of predetermined number of forms. We provide a third pair of openings as at 80° (see FIG. 9) for latching the box means 22 in vertical orientation.

The connection between the foot pedal 73 and the dowels 75, 76 includes a pair of cables 81, 82—see the lower central portion of FIG. 10. These are partially entrained around pulleys 83, 84 which are fixed to a cross member 85. The cables 81, 82 are threaded through the pulleys 83, 84 so as to extend transversely and are connected to the inner ends of the dowels 75, 76, respectively. The dowels 75, 76 are spring-loaded as by coil springs 86, 87 so as to be urged outwardly and against the trapezoidally shaped plates 65, 66 and into engagement with openings 77, 78 (for horizontal disposition) and openings 79 (for the 70° orientation) and the openings 80 for the 90°, i.e., vertical orientation.

Summary of Operation

For the handling of the string of business forms arranged in zig-zag folded configuration, we provide a printed forms transport receiver 20 which includes the undercarriage 21, a generally rectangular box means 22 pivotally supported on the undercarriage 21. The box means 22 has a pair of sides, a closed end 23, an open end opposite the end 23 which normally receives the string of forms, an open top and a planar bottom 27. The box means includes support means 26b (see FIG. 10) for the tine member 26. This tine element is positionable from a retracted position 26' (see FIG. 3) to the position shown in FIGS. 9 and 10 where the tine member 26 closes the open end of the box means 22.

The operation is commenced by introducing a string of interconnected zig-zag folded compacted business forms into the open end and onto the planar bottom 27 as is illustrated in FIG. 3. After a predetermined number of forms have been introduced into the box means 22, the tine element 26 is positioned in blocking relation to the open end to delimit and confine the predetermined number of forms.

The next step in the operation is to pivot the box means 22 through a vertical arc to support the predetermined number of forms on the tine member 26 as a transferrable stack. As seen in FIG. 4, the box means 22 is pivoted through a vertical arc and in so doing, the stack becomes compacted and fairly "square". Prior to pivoting, it is advantageous at times to introduce a barrier means such as a chip board 28 between the tines 26a and the last form of the stack.

With the box means 22 in a partially pivoted condition, i.e., at about 77° to the horizontal, the PFT is moved on the casters 61 to a location convenient to an inserting means I (see FIG. 2). The box means 22 is maintained in the partially pivoted condition by latch means 72 which include dowels 75, 76 which engage opening 79 in plates 65, 66.

Figure 7:
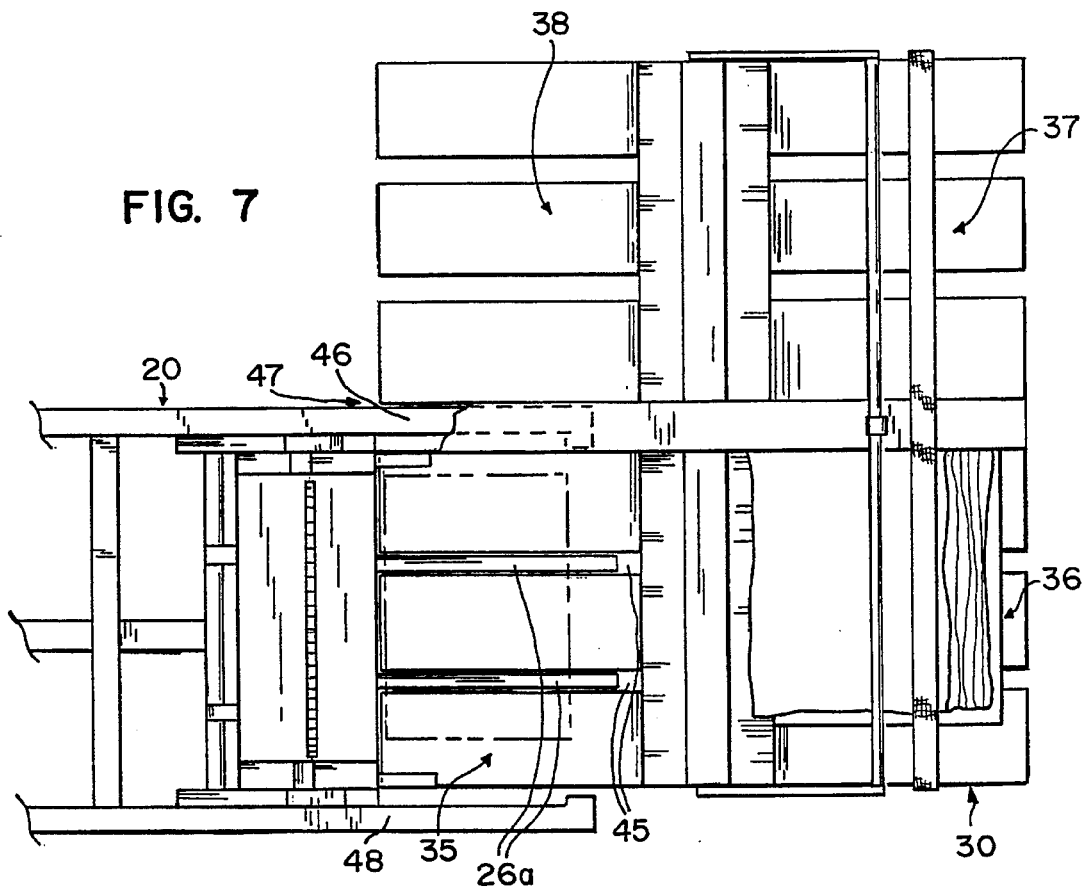
FIG. 7 is a top plan view of the PFT and PST corresponding to the showing in FIG. 5 and as seen along the sight line 7—7 applied to FIG. 5.
Figure 8:
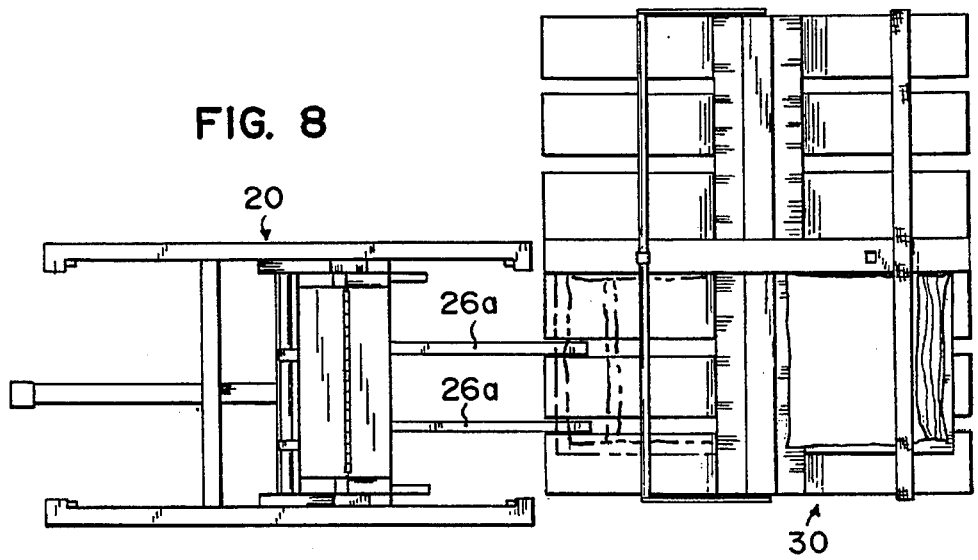
FIG. 8 is a view similar to FIG. 7 but corresponding to the showing in FIG. 6 as seen along the sight line 8—8.

The PFT 20 not only has the tines 26a projecting outwardly therefrom (see FIG. 7) but also has projecting rails 46, 48. As seen in FIG. 7, the rail 46 enters an opening 47 provided in the straight wall 39 to align the PFT 20 with the PST 30. The alignment is advantageous in that it positions the tines 26a over the tine-receiving slots 45 in the platform 31 of the PST 30. Thereafter the box means 22 is pivoted through a further vertical arc to cause the tines 26a to pass through the slots 45 and deposit the stack on the platform 31. The box means is maintained in its vertical orientation by the cooperation of the dowels 75, 76 and the openings 80 in the trapezoidal shaped plates 65, 66 (see FIG. 9).

The PST is equipped with a plurality of vertically-elongated, stacked receiving recesses 35—38. Each recess at its bottom is defined by the platform 31. It is further defined at two intersecting generally vertical sides by planar walls 43, 44 relative to the recess 38 (see FIG. 12). The wall 44 is provided by a divider 39 and the wall 43 is provided by a divider 40. The first divider 39 extends vertically and parallel to the slots 45 while the second divider 40 intersects the first divider 39 along a line 41 inclined to the vertical. The platform 31 is perpendicular to the second wall 43 and intersects the first wall 44 along a line 44a inclined to the horizontal.

This arrangement of walls and platform insures a square stack because the inclination of the stack to the horizontal (by virtue of butting up against the wall 43) is compensated for by the perpendicularity of the platform portion 42 to the wall 43. On the other hand, the stack sides are maintained square by virtue of the wall 44 being perpendicular to the ground so a stack is developed that is square and without any "lean".

As the string of forms is ready for introduction into the inserting means I, the top-most form is available by virtue of uncoupling the strap means 49, 50. This leading form and those following are threaded over the turn bar assembly 51 which is maintained in place by either clamp means 53 or 54 depending on which position the turn bar 51 is in.

Removable Tine Assemblies

Figure 13:
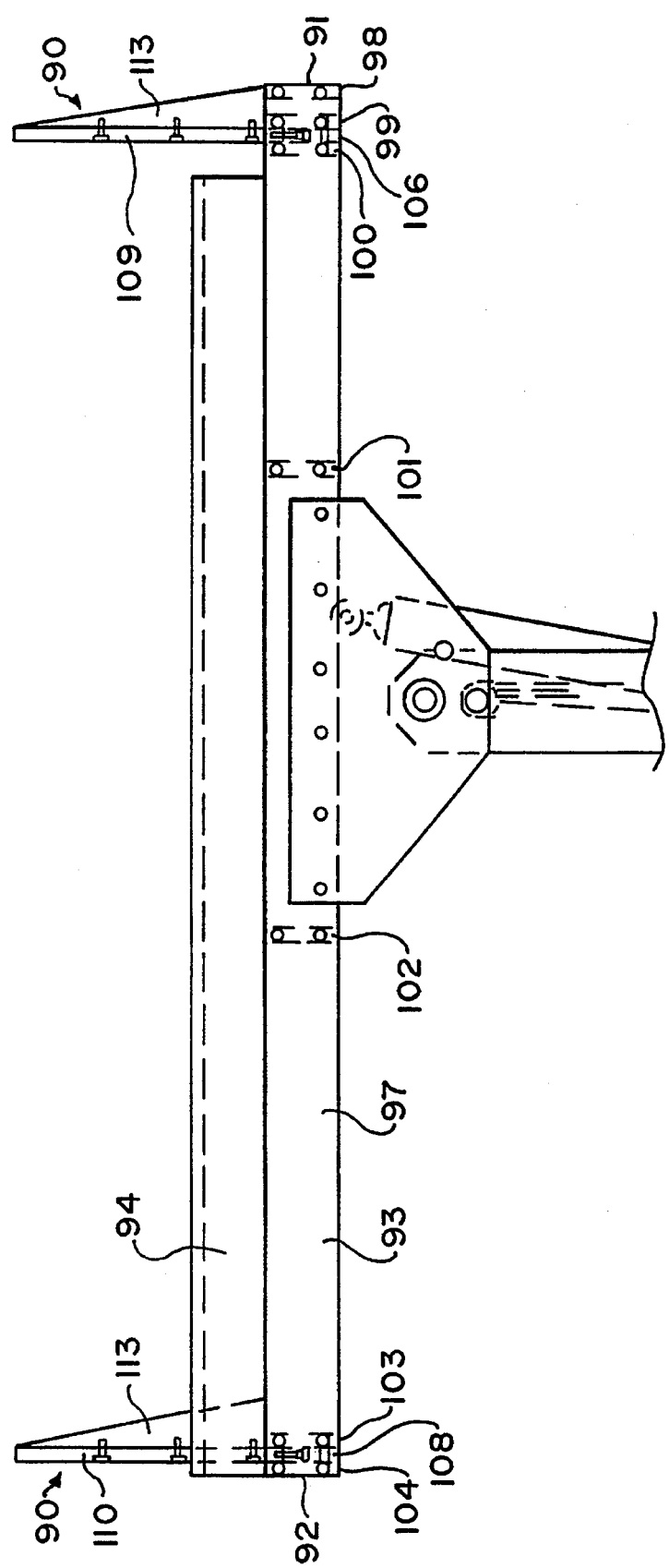
FIG. 13 is a fragmentary side elevational view of a PFT with tine assemblies formed in accordance with the invention.
Figure 14:
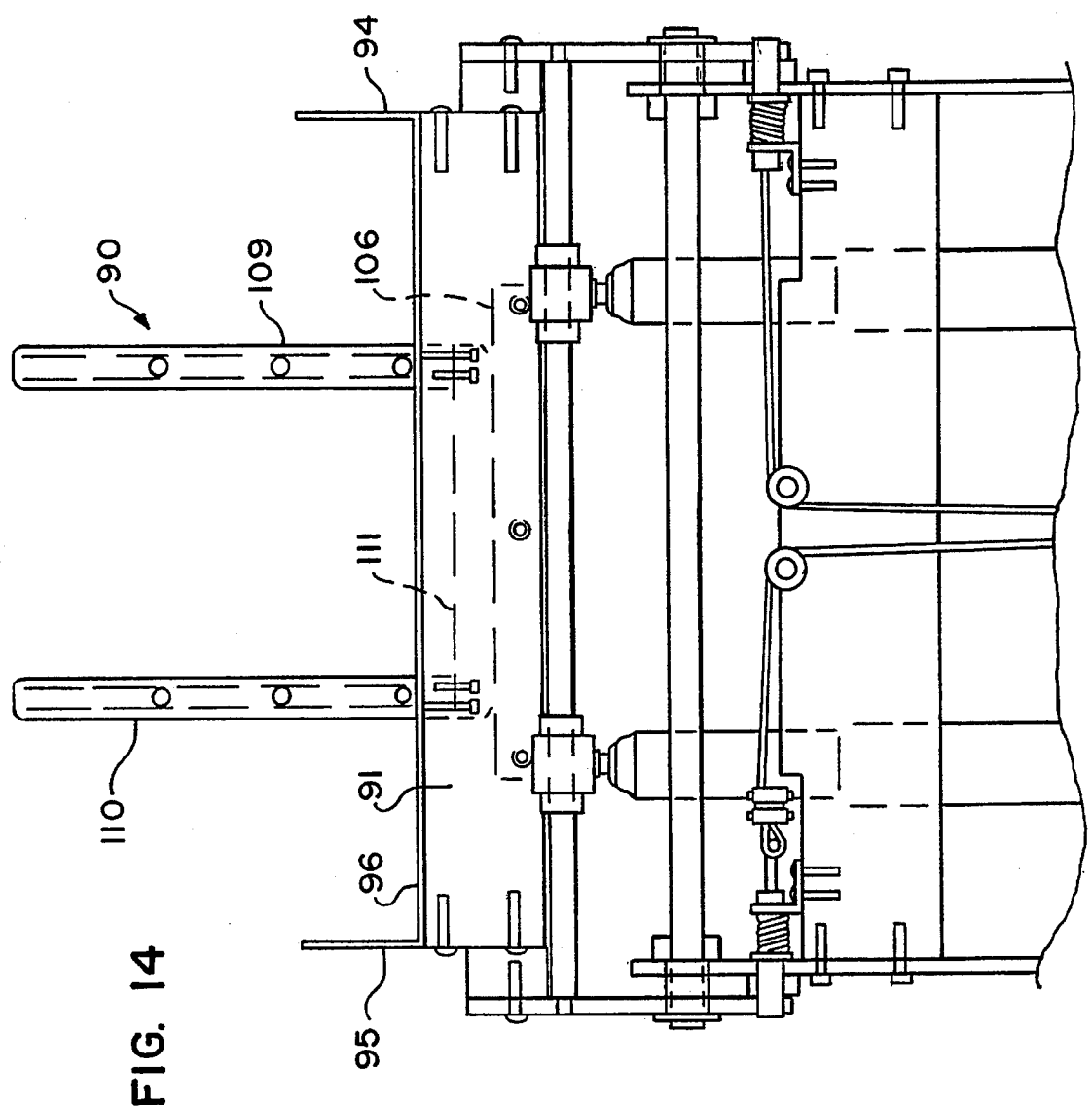
FIG. 14 is an end view of the PFT of FIG. 13.

FIGS. 13–15 illustrate a PFT with tine assemblies 90 and which are removably mounted on the box means 22. The PFT of FIGS. 13–15 is similar to the PFT of FIGS. 3–11 except for the tine assemblies and the means for removably mounting the tine assemblies on the PFT.

The box means of FIGS. 13–15 includes a first or front end 91 which is lowered when the box means is pivoted and a second or rear end 92 which is raised when the box means is pivoted. The box means further includes a bottom 93, a pair of side walls 94 and 95 which extend upwardly from the bottom, and an open top between the side walls.

The bottom 93 includes an elongated rectangular metal plate which is covered by a stainless steel sheet 96. The sheet 96 is supported by longitudinally extending side beams 97 and by a plurality of transverse metal beams 98, 99, 100, 101, 102, 103, and 104.

The transverse beams 98 and 99 are spaced slightly more than ½ inch apart, and a slot 105 (FIG. 15) is provided through the metal plate 96 and stainless steel sheet 97. A transverse beam 106 is secured between the beams 99 and 100, and the top of the beam 106 is spaced about 1 ¾ inch below the sheet 97, which defines the depth of the slot 105.

Similarly a slot 107 is provided between the transverse beams 103 and 104, and a transverse beam 108 is secured between the beams 103 and 104 to define the bottom of the slot.

Figure 17:
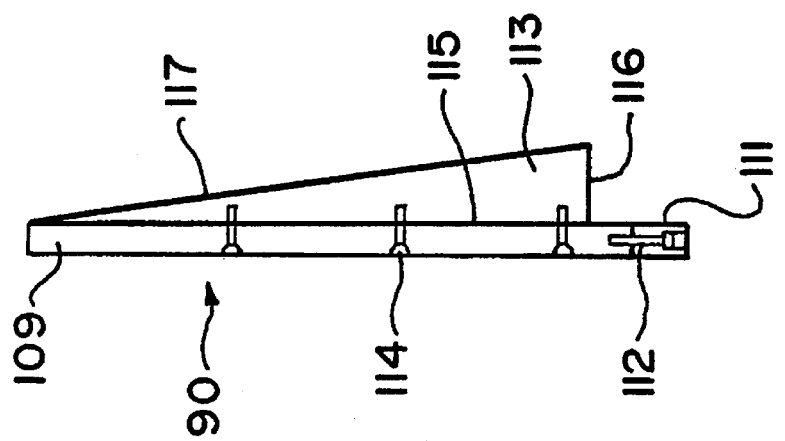
FIG. 17 is a side view of the tine assembly of FIG. 16.
Figure 16:
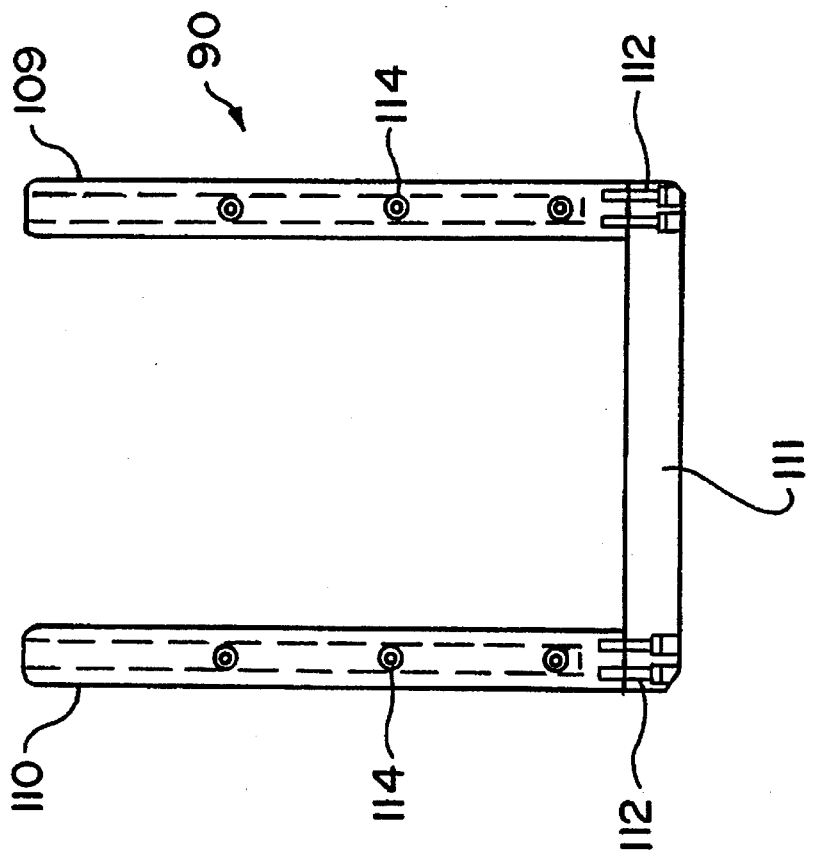
FIG. 16 is an end view of one of the tine assemblies of FIG. 13.

Referring to FIGS. 16 and 17, each of the tine assemblies 90 includes a pair of parallel tines or bars 109 and 110 which are secured to a bottom cross bar 111 by bolts 112. A triangular reinforcing brace or upwardly tapered flange 113 is secured to each of the tines by bolts 114. Each brace includes a flat edge 115 which abuts the tine, a flat bottom edge 116 which extends perpendicularly to the tine, and a flat angled edge 117 which angles upwardly and toward the tine. The distance between the bottom edge 116 and the bottom of the cross bar 111 is approximately the same as the depth of the slots 105 and 107. The thickness of the cross bar 111 and the tines is approximately the same as the thickness of the slots.

Either of the tine assemblies can be inserted into either of the slots. The tine assembly which is inserted into the slot 105 at the front end 91 of the box means is positioned so that the braces 113 face the front end. The business forms will therefore be supported by the flat surfaces of the tine opposite the brace when the box means is inclined, and the braces will reinforce the tines against the weight of the forms.

When the the business forms will be removed from the PFT in the A to Z sequence, or first-in-first-out, the forms are introduced into the box means at the front end 91. The tine assembly is removed from the slot 105 to permit the forms to move over the top of the stainless steel plate 97 toward the back end 92. One of the tine assemblies is inserted into the slot 107 to provide a backstop for the forms. The tine assembly is preferably positioned so that the braces 113 extend toward the front end so that the forms can ride up the inclined surfaces 117 of the braces. After the forms are loaded onto the box means, a tine assembly is inserted into the slot 105 to support the business forms when the box means is tilted.

When the forms will be removed from the PFT in Z to A sequence, or first-in-last-out, the forms are introduced into the box means at the back end 92. The tine assembly is removed from the slot 107, and a tine assembly is inserted into the slot 105. If desired, the tine assembly in the slot 105 can be positioned so that the braces 113 face the back end 92 to provide an inclined backstop. Before the box means is tilted, the tine assembly in the slot 105 can be reversed so that the forms will be supported by the flat surfaces of the tines.

The tine assemblies are interchangeable, and either tine assembly can be inserted in either slot.

The stack of forms is transferred from the PFT to the PST as previously described. The tines at the bottom end 91 of the inclined box means are aligned with the slots 45 in the platform 31 of the PST. When the box means is pivoted to a vertical position, the tines pass through the slots and the stack of forms is transferred to the platform 31.

While in the foregoing specification a detailed description of the invention has been set down for the purpose of illustration and for compliance with the Statute, many variations in the details herein given may be made by those skilled in the art without departing from the spirit and scope of the invention.

We claim:

1. A method for handling business forms comprising the steps of:

providing a printed forms transport receiver including an undercarriage, a generally rectangular box means having a pair of sides, first and second ends, an open top and a planar bottom, said box means being pivotally supported on said undercarriage for movement between a generally horizontal position and a generally vertical position in which the first end of the box means is lowered and the second end is raised, the bottom of the box means being provided with a slot adjacent each of the ends thereof, and a pair of tine assemblies adapted to be slidably and removably mounted in said slots, inserting a tine assembly into the slot adjacent the second end if A to Z dispensing of business forms is desired or inserting a tine assembly into the slot adjacent the first end if Z to A dispensing of business forms is desired, introducing a string of interconnected zig-zag folded compacted business forms into the end of the box means without a tine assembly, after a predetermined number of forms have been introduced into the box means, inserting a tine assembly into the slot without a tine assembly, and pivoting the box means through a vertical arc to lower the first end of the box means and to support said forms as a stack on the tine assembly adjacent the first end.

2. The method of claim 1 in which each of the tine assemblies includes a pair of tines which are adapted to extend perpendicularly to the bottom of the box means, a base which extends perpendicularly between the tines and which is connected thereto, and a pair of generally triangular braces which are attached to the tines, including the step of inserting the tine assembly into the slot adjacent the first end so that the braces extend toward the first end whereby the forms engage the surface of each tine which is opposite the brace when the box means is pivoted to lower the first end.

3. The method of claim 16 including the step of inserting the tine assembly into the slot adjacent the second end so that the braces extend away from the second end whereby forms which are introduced at the first end engage the braces of the tine assembly adjacent the second end.

4. A method for handling business forms comprising the steps of:

providing a printed forms transport receiver including an undercarriage, a generally rectangular box means having a pair of sides, first and second ends, an open top and a planar bottom, said box means being pivotally supported on said undercarriage for movement between a generally horizontal position and a generally vertical position in which the first end of the box means is lowered and the second end is raised, the bottom of the box means being provided with a slot adjacent each of the ends thereof, and ramp-equipped tine means adapted to be slidably and removably mounted in said slots, inserting said tine means in one of said slots, introducing a string of interconnected zig-zag folded compacted business forms into the end of the box means without a tine means, and advancing said compacted business forms toward said tine means and up the ramp of said tine means.

* * * * *

UNITED STATES PATENT AND TRADEMARK OFFICE
CERTIFICATE OF CORRECTION

PATENT NO. : 5,456,571
DATED : October 10, 1995
INVENTOR(S) : William R. Schoenherr et al It is certified that error appears in the above-identified patent and that said Letters Patent is hereby corrected as shown below:

Col. 10, line 16 change "16" to —2—.

Signed and Sealed this

Second Day of January, 1996

*Attest:*

BRUCE LEHMAN

*Attesting Officer*      Commissioner of Patents and Trademarks